United States Patent [19]

Bernhard

[11] Patent Number: 4,680,136
[45] Date of Patent: Jul. 14, 1987

[54] METHOD FOR PREPARING COMPOSITIONS WHICH CAN BE USED IN THE PRODUCTION OF SODIUM DITHIONITE; AND THE USE OF SUCH COMPOSITIONS

[75] Inventor: Ragnar Bernhard, Falun, Sweden

[73] Assignee: Stora Kopparbergs Bergslags AB, Falun, Sweden

[21] Appl. No.: 731,296

[22] Filed: May 7, 1985

[51] Int. Cl.$^4$ .................. C01B 17/66; C01D 5/14; C09K 3/00
[52] U.S. Cl. .................. 252/188.2; 252/188.21; 252/188.22; 423/515; 423/519
[58] Field of Search .............. 423/512 A, 515, 519; 252/188.2, 188.21, 188.22, 188.23, 188.24

[56] References Cited

U.S. PATENT DOCUMENTS

| | | | |
|---|---|---|---|
| 719,720 | 2/1903 | Bazlen | 423/515 |
| 2,147,162 | 2/1939 | Haglund | 423/519 |
| 2,991,152 | 7/1961 | Goerrig et al. | 423/515 |
| 3,216,790 | 11/1965 | Murib | 423/515 |
| 3,226,185 | 12/1965 | Gyan et al. | 423/515 |
| 3,477,815 | 11/1969 | Miller et al. | 423/242 A |
| 3,542,511 | 11/1970 | Shah | 423/242 A |
| 3,826,812 | 7/1974 | Cook et al. | 423/519 X |
| 3,826,818 | 7/1974 | Heitman | 423/515 |
| 3,897,544 | 7/1975 | Maeda et al. | 423/515 |
| 3,917,807 | 11/1975 | Yasue et al. | 423/515 |
| 3,933,676 | 1/1976 | Wade | 423/515 X |
| 4,100,098 | 7/1978 | Magan | 423/515 X |
| 4,148,684 | 4/1979 | Farin | 423/DIG. 3 |
| 4,283,303 | 8/1981 | Ellis | 423/515 X |
| 4,379,130 | 4/1983 | Brady | 423/519 X |

FOREIGN PATENT DOCUMENTS

| | | | |
|---|---|---|---|
| 598761 | 5/1960 | Canada | 423/519 |
| 27369 | 4/1981 | European Pat. Off. | 423/515 |
| 2442418 | 3/1976 | Fed. Rep. of Germany | 423/515 |
| 3427297 | 4/1986 | Fed. Rep. of Germany | 423/515 |
| 38407 | 11/1971 | Japan | 423/515 |

OTHER PUBLICATIONS

Derwent Abstract No. 30198c/17 (17th week, 1980), "Bleaching Agent Mfr. –. . . ".

Primary Examiner—John F. Terapane
Assistant Examiner—Matthew A. Thexton
Attorney, Agent, or Firm—Fred Philpitt

[57] ABSTRACT

There is provided a method for producing compositions which can be used for preparing sodium dithionite, in which sulphur dioxide is brought into contact with a recirculating aqueous solution of sodium hydroxide and previously absorbed sulphur dioxide to a ratio of sulphur dioxide and the sum of sulphur dioxide and sodium oxide of 0.61–0.66, whereafter the resultant mixture is pressurized and liquid sulphur dioxide introduced therein to a ratio between sulphur dioxide and the sum of sulphur dioxide and sodium oxide of 0.75–0.81, and the water content is adjusted to a concentration of sulphur dioxide+sodium oxide of 10–13 percent by weight. The invention also relates to the use of the prepared composition for the manufacture of dithionite.

5 Claims, 1 Drawing Figure

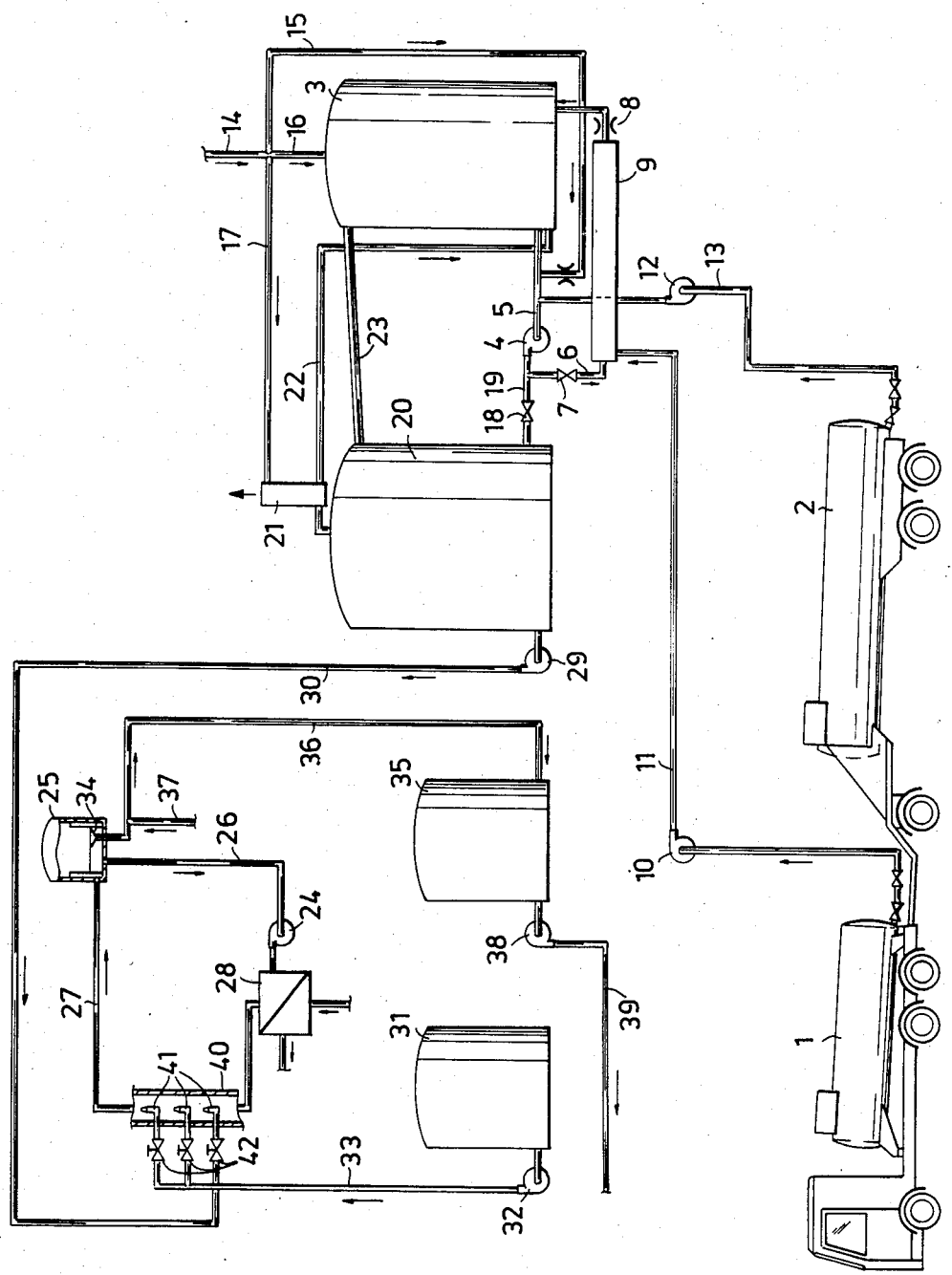

METHOD FOR PREPARING COMPOSITIONS WHICH CAN BE USED IN THE PRODUCTION OF SODIUM DITHIONITE; AND THE USE OF SUCH COMPOSITIONS

The present invention relates to a method of preparing compositions which can be used in the production of sodium dithionite; and the use of such compositions.

According to one known method for preparing sodium dithionite, 40–50 percent by weight aqueous solution of sodium hydroxide, liquid sulphur dioxide and water are mixed with the reducingagent mixture comprising 12 percent by weight sodium borohydride, 40 percent by weight sodium hydroxide and 48 percent by weight water in a conduit system, in which the mixture is circulated in order to conduct away the high quantity of heat of reaction generated. Because of the number of components to be mixed together, it is necessary to make several adjustments. In addition, liquid sulphur dioxide is difficult to handle.

Consequently an object of the present invention is to provide a method for producing compositions which can be used in the production of sodium dithionite and which facilitate the work of the manufacturer of the dithionite, by reducing the number of components which need be handled, and therewith reducing the number of adjustments which need be made, and by reducing cooling requirements.

This is achieved in accordance with the present invention by means of a method which comprises bringing sulphur dioxide into contact with a recirculating aqueous solution of sodium hydroxide and previously absorbed sulphur dioxide to a ratio between sulphur dioxide and the sum of sulphur dioxide and sodium oxide ($SO_2/(SO_2+Na_2O)$) of 0.61–0.66, preferably 0.63–0.65, and subsequently pressurizing the resultant mixture and introducing liquid sulphur dioxide thereinto to a ratio between sulphur dioxide and the sum of sulphur dioxide and sodium oxide of 0.75–0.81, preferably about 0.78, and adjusting the water content to a concentration of sulphur dioxide+sodium oxide of 10–13 percent by weight, preferably about 12 percent by weight.

In the first part stage of the method according to the invention, in which sulphur dioxide is brought into contact with a recirculating aqueous solution of sodium hydroxide and previously absorbed sulphur dioxide, sulphur dioxide is preferably introduced in the form of a preferably dry sulphur dioxide-containing flue gas obtained in the manufacture of sulphuric acid. Flue gases obtained from plants which combust sulphur-containing fuels can also be used, provided that measures are taken to prevent condensation of the water when handling the gas with the recirculating aqueous solution of sodium hydroxide and sulphur dioxide. The sulphur dioxide containing gas is preferably brought into contact with the aforesaid recirculating aqueous solution in a conventional scrubber plant.

This part method stage is preferably carried out continuously at approximately atmospheric pressure, a part of the solution being removed from circulation and replaced with an aqueous solution of sodium hydroxide, although the part stage can also be carried out intermittently. The method is controlled in both alternatives in a manner such that the resultant mixture exhibits a ratio between sulphur dioxide and the sum of sulphur dioxide and sodium oxide of 0.61–0.66, preferably 0.63–0.65.

In the second part method stage, the mixture obtained in the first part stage is transferred to a pressurized space or chamber, for example a space standing under a pressure in the order of 2.5 bars or more, preferably in the form of a section or part of a recirculation loop defined upstream by a recirculation pump and downstream by a constriction, in which space liquid sulphur dioxide is introduced into the mixture to a ratio $SO_2/(SO_2+Na_2O)$ of 0.75–0.81, preferably about 0.78, and the water content being adjusted to a concentration of sulphur dioxide+sodium oxide of 10–13 percent by weight, preferably about 12 percent by weight, so as to obtain a product in the form of a solution which can be stored at atmospheric pressure.

The invention also relates to the use of a composition prepared in accordance with the method according to the invention for preparing dithionite by reduction. In use the composition is mixed with a reducing agent mixture of preferably the aforementioned conventional kind and is optionally recirculated in a conduit system, optionally while diluting the mixture by adding water. If desired, the mixture can be diluted with water prior to circulation, instead of during circulation, or the end product itself can be diluted.

BRIEF DESCRIPTION OF THE DRAWING

The invention will now be described in more detail with reference to a plant illustrated schematically in the accompanying drawing and intended for the preparation of sodium dithionite in accordance with the invention.

In the drawing the references 1 and 2 identify respectively a road tanker and a tank trailer. The tank of the road tanker 1 is adapted to contain liquid sulphur dioxide and the tank trailer 2 to accommodate a sodium sulphite-bisulphite solution in a ratio $SO_2/(SO_2+Na_2O)$ in the order of 0.61–0.65 and a concentration in the order of, for example, 40 percent by weight. The total concentration of sulphur dioxide+sodium oxide in the combined contents of the tanks of the tanker 1 and the tank trailer 2 is suitably about 50 percent by weight.

The reference 3 identifies a tank having an internal prevailing pressure of approximately atmospheric pressure and forming part of a recirculation system comprising a circulation pump 4, a conduit 5 extending from the tank 3 to the suction side of the pump 4, and a conduit 6 which extends between the the pressure side of the pump 4 and the tank 3 and which incorporates a closure valve 7, a restriction 8, and a conduit part 9 of enlarged crossection. The tank of the road tanker 1 can be connected to the conduit part 9 by means of a conduit 11 incorporating a pump 10, while the trailer tank 2 can be connected to the conduit 5 by means of a conduit 13 incorporating a pump 12. The reference 14 identifies a water-supply conduit which branches into three conduits 15,16,17, of which the conduit 15 supplies water to the conduit 5 for diluting a sulphite-bisulphite solution conveyed through the conduit 13. The flows through the inlet conduits 11,13,14 and in the recirculation systems 3–9 are adjusted with the aid of control means not shown, and by adjusting the constriction 8, so as to maintain in the conduit part 9 a pressure in the order of, for example, 2.5 bars while emptying the road tanker and the tank trailer 2. This avoids in a favourable manner the need of providing conventional, expensive pressure vessels. With the aid of the hitherto described arrangement there is prepared and supplied to the tank 3 a sodium sulphite-bisulphite solution having a ratio $SO_2/(SO_2+Na_2O)$ of 0.75–0.81, and a concentration (10–13 percent by weight) which enables it to be stored at atmospheric pressure.

The pressure side of the pump 4 can be connected to a storage tank 20 by means of a conduit 19 provided with a closure valve 18, the pressure prevailing in the storage tank also being approximately atmospheric pressure. Gas departing from the upper part of the tank 20 is led-off subsequent to being washed in a scrubber 21 or the like with water supplied through the conduit 17. This water, with sulphur dioxide dissolved therein, is supplied to the tank 3 through a conduit 22. Gas collected in the upper part of the tank 3 is sprayed with water passed through the conduit 16, while undissolved gases are conducted to the upper part of the tank 20 through a gas conduit 23.

For the purpose of preparing sodium dithionite, solution from the tank 2 is combined with a conventional reducing agent comprising substantially an aqueous solution of sodium borohydride and sodium hydroxide. This is effected in a recirculation circuit incorporating a circulation pump 24, a vessel 25, a conduit 26 extending between the bottom of the vessel 25 and the suction side of the pump 24, and a conduit 27 which extends between the pressure side of the pump 24 and the vessel 25 and in which there is arrranged a heat exchanger 28 for cooling the circulating liquid to a desired temperature level. The sodium sulphite-bisulphite solution is supplied to the conduit 27 through a conduit 30 which incorporates a pump 29, while the solution of reducing agent is supplied to the conduit 27 from a storage tank 31 through a conduit 33 incorporating a pump 32. Prepared sodium dithionite solution departs through a spillway 34 arranged in the vessel 25 and is conducted to a storage tank 35 through a conduit 36, optionally after being diluted with water entering through a conduit 37. Prepared dithionite solution is conveyed to consumer sites from the tank 35 through a conduit 39 incorporating a pump 38.

In order to avoid yield losses due to hydrogen formation in the recirculation circuit 24–28, it has been found highly suitable to charge the solution of the reducing agent, and advantageously also the sulphite-bisulphite solution, to the liquid circulating in the circuit 24–28, substantially isokinetically, i.e. the supplied solutions are introduced into the conduit 27 in a direction and at a flow rate which coincides substantially with the flow direction and flow rate of the recirculated solution. To this end, the conduits 30 and 33 discharge into the conduit 27 through nozzles 41 directed downstream, as evident from the part 40 of said conduit 27 shown in axial section, wherewith each conduit 30 or 33 can be branched in the manner indicated, each branch being provided with a nozzle 41 and an adjustable valve 42. The solution leaving the circulation systems 24–28 through the conduit 36 can be admixed, for example, with a complexing agent for separating undesirable metal contaminants, and also with pH-regulating additives.

EXAMPLE 1

Sulphite-bisulphite solution obtained from a flue gas scrubber adapted for sulphur-dioxide containing flue gas derived from a sulphuric acid plant having a sulphite+bisulphite concentration in percent $Na_2O+SO_2=39\%$ and a ratio $SO_2/(SO_2+Na_2O)$ of 0.63–0.65 was used together with liquid sulphur dioxide and water to produce a composition suitable for the preparation of dithionite.

In this respect 4680 kg of liquid sulphur dioxide were charged to a pressurized space and added with 22,000 kg 39%-sulphite-bisulphite solution, having a ratio $SO_2/(SO_2+Na_2O)$ of 0.64, and 79,320 kg water, which gave $SO_2/(SO_2+Na_2O)=0.775$ and a concentration of 12%.

The solution was passed to a storage tank in which a pressure equal to atmospheric pressure was maintained and then used directly for preparing dithionite, it being necessary only to add a reducing agent mixture, for example a reducing agent retailed by Ventron Corporation, Mass. USA; under the registered trade mark BOROL ® containing approximately 12 percent by weight $NaBH_4$, 40 percent by weight NaOH and 48 percent by weight $H_2O$. The outgoing dithionite solution was diluted with water to a concentration of 3% by weight.

EXAMPLE 2

Example 1 was repeated but with the ratio $SO_2/(SO_2+Na_2O)$ of the sulphite-bisulphite solution equal to 0.65; and this time 4333 kg of liquid sulphur dioxide and 76,775 kg water were added, so as to obtain the same factor of 0.775.

EXAMPLE 3

Example 1 was repeated and the same sulphite-bisulphite solution as that in Example 1 was used, although with the desire to obtain a product having a ratio of $SO_2/(SO_2+Na_2O)=0.790$ kg. Consequently 5741 kg of liquid sulphur dioxide and 85,684 kg water were added to the 20,000 kg sulphite-bisulphite solution in this example.

I claim:

1. A method for preparing compositions capable of being used in the preparation of sodium dithionite by means of a continuous process using a reducing agent comprising an aqueous solution of sodium borohydride and sodium hydroxide, which method comprises bringing sulphur dioxide into contact with a recirculating aqueous solution of sodium hydroxide and previously absorbed sulphur dioxide to a ratio between sulphur dioxide and the sum of sulphur dioxide and sodium oxide of 0.61–0.66, pressurizing the resultant mixture and introducing liquid sulphur dioxide thereinto to achieve a ratio between sulphur dioxide and the sum of sulphur dioxide and sodium oxide of 0.75–0.81, and adjusting the water content to a concentration of $SO_2+Na_2O$ of 10–13 percent by weight.

2. A method according to claim 1 wherein liquid sulphur dioxide or a mixture of liquid sulphur dioxide and diluting water is supplied to the mixture in a pressurized part of a recirculation loop defined upstream by a recirculating pump and downstream by a constriction.

3. A method according to claim 1 wherein sulphur dioxide is added to the recirculating aqueous solution of sodium hydroxide and previously absorbed sulphur dioxide to a ratio between sulphur dioxide and the sum of sulphur dioxide and sodium oxide of 0.63–0.65 prior to pressurizing the system.

4. A method according to claim 1 wherein the liquid sulphur dioxide is introduced into the pressurized mixture to a ratio between sulphur dioxide and the sum of sulphur dioxide and sodium oxide of about 0.78.

5. A method according to claim 1 wherein the water content is adjusted to a concentration of sulphur dioxide and sodium oxide of about 12 percent by weight.

* * * * *